April 26, 1955     D. A. MACRO     2,707,050
FILTER CARTRIDGE
Filed Dec. 17, 1951     2 Sheets-Sheet 1
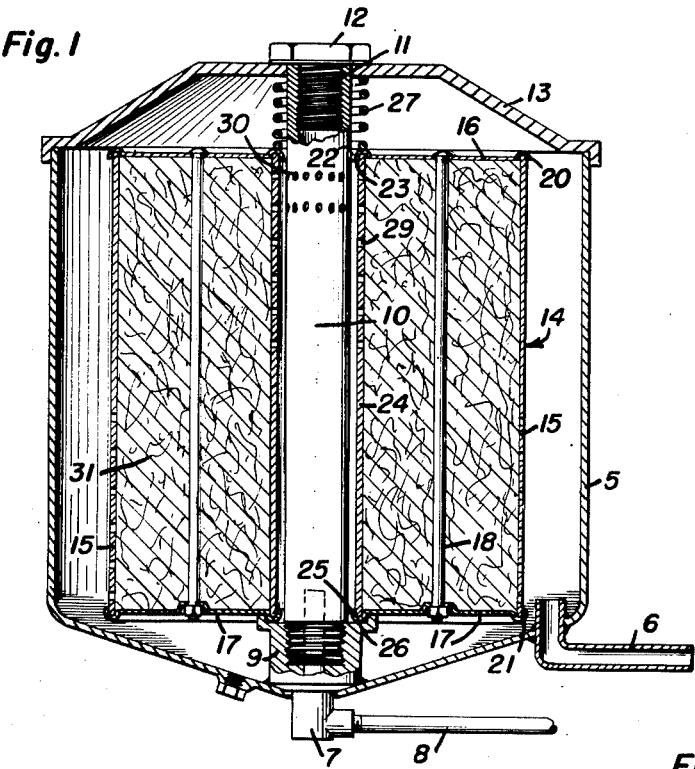
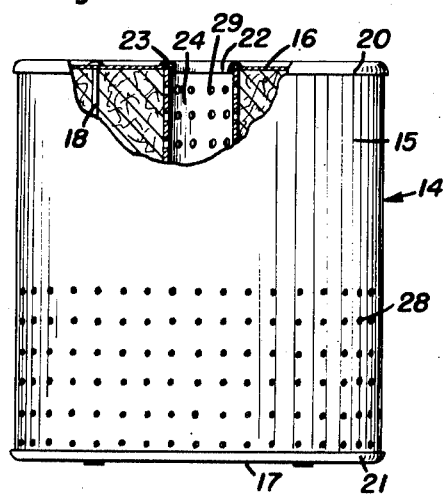
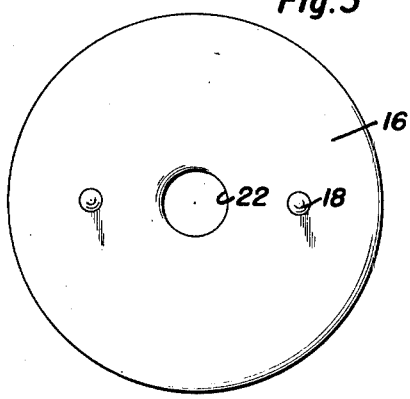
David A. Macro
INVENTOR.

April 26, 1955  D. A. MACRO  2,707,050
FILTER CARTRIDGE
Filed Dec. 17, 1951  2 Sheets-Sheet 2

David A. Macro
INVENTOR.

United States Patent Office 2,707,050
Patented Apr. 26, 1955

2,707,050

FILTER CARTRIDGE

David A. Macro, Sheridan, N. Y.

Application December 17, 1951, Serial No. 262,098

2 Claims. (Cl. 210—131)

The present invention relates to new and useful improvements in filters and more particularly to a replaceable cartridge construction for the filter.

An important object of the invention is to provide a cartridge including a casing for holding the filtering element and providing the casing with perforate and imperforate end portions whereby the cartridge may be reversed in the filter shell, if desired.

Another object is to provide a novel casing construction for the filtering element and including top and bottom plates having means for holding the outer walls and center tube of the casing in fixed assembled relation thereto.

A further object is to provide a device of the character of simple and practical construction, which is efficient in operation, relatively inexpensive to manufacture and otherwise well adapted for the purposes for which the same is intended.

Figure 4:
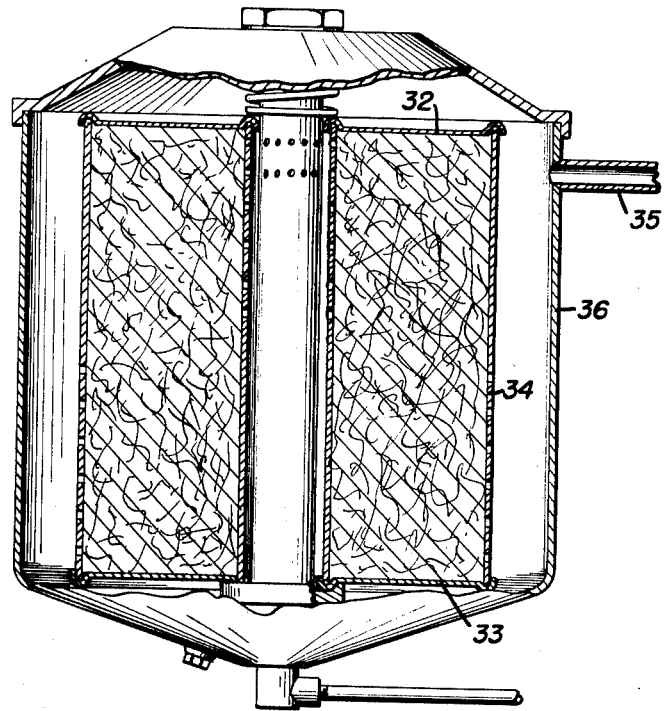
Figure 5:
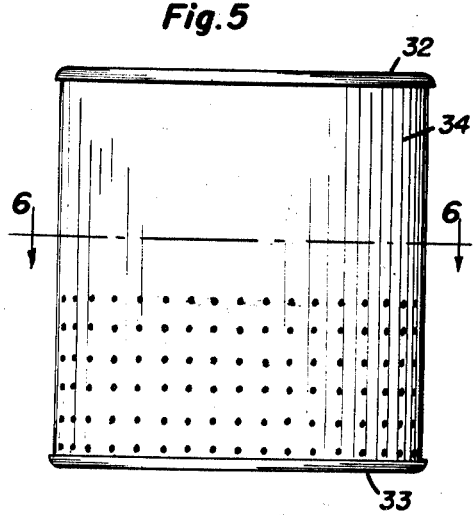
Figure 6:
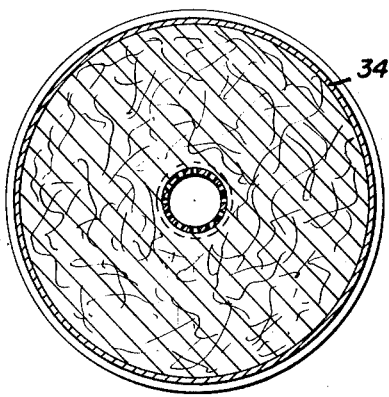

Other objects and advantages reside in the details of construction and operation as more fully hereinafter described and claimed, reference being had to the accompanying drawings forming part hereof, wherein like numerals refer to like parts throughout, and in which:

Figure 1 is a vertical sectional view of the filter;
Figure 2 is a side elevational view of the cartridge with parts broken away and shown in section;
Figure 3 is a top plan view of the cartridge;
Figure 4 is a vertical sectional view of a modification;
Figure 5 is a side elevational view of the modified cartridge; and,
Figure 6 is a transverse sectional view taken on a line 6—6 of Figure 5.

Referring now to the drawings in detail, and first with respect to the preferred embodiment of my invention as illustrated in Figures 1 to 3 inclusive, the numeral 5 designates the shell of a filter having an inlet tube 6 connected to its bottom portion and a nipple 7 at its central bottom portion having an outlet tube 8 connected thereto. An internally threaded fitting 9 is welded to the inside of the bottom of the shell and to which the nipple 7 is connected and an inner central tube 10 is threaded at its lower end in fitting 9 and is internally threaded at its upper end to receive a plug 11 having a head 12 for holding a cover 13 on top of the shell.

A replaceable cartridge 14 is placed in the shell and comprises a casing having an annular wall 15 and top and bottom plates 16 and 17 clamped against the upper and lower edges of the wall 15 by bolts and nuts 18 or other suitable fasteners. The outer edge of top plate 16 is formed with an annular downturned channel 20 in which the upper edge of wall 15 is closely fitted and bottom plate 17 is formed with an upturned channel 21 in which the lower edge of wall 15 is closely fitted.

A central opening 22 having an annular downturned channel 23 is formed in top plate 16 for closely fitting over the upper end of an outer central tube 24 and a central opening 25 having an annular upturned channel 26 is formed in bottom plate 17 for closely fitting the lower end of outer central tube 24 therein.

The cartridge casing 14 rests on nipple 9 with inner tube 10 centered in the cartridge and spaced from the outer tube 24 by the upper and lower channels 23 and 26 and a coil spring 27 surrounds the upper end of tube 10 and is held compressed on top of top plate 16 by cover 13. The cartridge is of a diameter substantially less than the diameter of shell 5 to space the walls 15 from the shell and the lower half of walls 15 is perforated, as shown at 28, while the upper half is imperforate.

Outer tube 24 is perforated at its upper half, as shown at 29, while its lower half is imperforate and inner tube 10 is formed with perforations 30 at its upper portion.

The cartridge casing 14 is filled with a suitable type of filtering element 31 and liquid entering the shell 5 by way of tube 6 will pass into the cartridge through its perforated lower half 28 and out through the perforated upper half of outer tube 24, the liquid then flowing upwardly between tubes 10 and 24 and into the inner tube 10 through the perforations 30 to pass outwardly through the outlet tube 8.

If desired, the cartridge may be reversed in the shell 5 to position the perforated half of the cartridge uppermost and position the perforated half of the outer tube 24 lowermost.

In Figures 4 to 6 inclusive I have illustrated a modified cartridge construction wherein the top and bottom plates 32 and 33 are welded to the annular wall 34 to provide a discardable type cartridge.

Also if desired, the inlet tube 35 may be attached to the upper portion of shell 36.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A filter comprising a shell having an inlet and an outlet, a fitting in the bottom of the shell and connected to the outlet, a vertical perforated tube connected at the lower end to the fitting and positioned centrally in the shell, and a replaceable cartridge in the shell and comprising a casing composed of an annular wall said wall having a perforated lower half and an imperforate upper half, a second central tube surrounding the first named tube, said second tube having a perforated upper half and an imperforate lower half, imperforate upper and lower plates, bolts connecting the plates to each other and holding the plates assembled to the wall and to the second central tube, annular channels at the peripheries of the plates in which the upper and lower edges of the wall are closely fitted, said plates each having a central opening to receive the first named tube, and opposed annular channels at the opening surrounding and in sealing contact with the first named tube, said second named perforated tube having its upper and lower ends closely fitted in said last named channels and centrally spaced outwardly with respect to the first named tube.

2. A filter comprising a shell having an inlet and an outlet, a fitting in the bottom of the shell and connected to the outlet, said fitting having a dished upper surface, a vertical perforated tube connected at the lower end to the fitting and positioned centrally in the shell, and a replaceable cartridge in the shell and comprising a casing composed of an annular wall, said wall having a perforated lower half and an imperforate upper half, a second central tube surrounding the first named tube, said second tube having a perforated upper half and an imperforate lower half, imperforate upper and lower plates, bolts connecting the plates to each other and holding the plates assembled to the wall and to the second central tube, annular channels at the peripheries of the plates in which the upper and lower edges of the wall are closely fitted, said plates each having a central opening to receive the first named tube, and opposed annular channels at the openings surrounding and in sealing contact with the first named tube, said second named perforated tube having its upper and lower ends closely fitted in said last named channels, the channel in said lower plate being received in the dished portion of said fitting for spacing the first named tube centrally in the second tube, and resilient means engaged between the top of said shell and said upper plate for maintaining the last named channel within the dished portion of said fitting.

References Cited in the file of this patent

UNITED STATES PATENTS

| | | |
|---|---|---|
| 2,294,262 | Wilkinson | Aug. 25, 1942 |
| 2,337,238 | Griffith | Dec. 21, 1943 |
| 2,593,227 | Wagner | Apr. 15, 1952 |
| 2,601,404 | Lasky | June 24, 1952 |
| 2,626,056 | Macro | Jan. 20, 1953 |

FOREIGN PATENTS

| | | |
|---|---|---|
| 533,576 | Great Britain | Feb. 17, 1941 |